US012492990B2

(12) United States Patent
Kuga et al.

(10) Patent No.: US 12,492,990 B2
(45) Date of Patent: Dec. 9, 2025

(54) SPECTROSCOPIC MEASUREMENT DEVICE

(71) Applicant: HAMAMATSU PHOTONICS K.K., Hamamatsu (JP)

(72) Inventors: Takayoshi Kuga, Hamamatsu (JP); Yoichi Kawada, Hamamatsu (JP); Takashi Yasuda, Hamamatsu (JP); Kazutaka Tomari, Hamamatsu (JP); Masatoshi Fujimoto, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 220 days.

(21) Appl. No.: 17/839,542

(22) Filed: Jun. 14, 2022

(65) Prior Publication Data

US 2022/0404274 A1 Dec. 22, 2022

(30) Foreign Application Priority Data

Jun. 16, 2021 (JP) ................... 2021-100259

(51) Int. Cl.
*G01N 21/3581* (2014.01)
*G01J 3/02* (2006.01)

(52) U.S. Cl.
CPC ........ *G01N 21/3581* (2013.01); *G01J 3/0224* (2013.01)

(58) Field of Classification Search
CPC ...................... G01N 21/3581; G01N 21/3586
See application file for complete search history.

(56) References Cited

U.S. PATENT DOCUMENTS 9,400,214 B1 * 7/2016 Demers ..................... G01J 3/10
2005/0010866 A1 * 1/2005 Arnone et al. ........... A61C 5/00
433/215

(Continued)

FOREIGN PATENT DOCUMENTS

JP 2000-352558 A 12/2000
JP 2005-024678 A 1/2005

(Continued)

OTHER PUBLICATIONS

Globisch B et al., "Fully-integrated THz transceiver with 4.5 THz bandwidth and 70 dB dynamic range", 2016 41st International Conference on Infrared, Millimeter, amd Terahertz Waves (IRMMW-THZ), IEEE, Sep. 25, 2016, p. 1-p. 2, XP033010354.

*Primary Examiner* — Casey Bryant
(74) *Attorney, Agent, or Firm* — Faegre Drinker Biddle & Reath LLP

(57) ABSTRACT

A spectroscopic measurement device includes: a light source unit configured to output pump light and probe light; a terahertz wave generation unit configured to generate a terahertz wave by the input of the pump light; a terahertz wave detection unit to which the terahertz wave and the probe light are input and configured to modulate the probe light based on a refractive index that changes due to an electro-optical effect according to the input of the terahertz wave; and a light detection unit configured to detect the probe light modulated by the terahertz wave detection unit. A main body unit is configured to include the light source unit and the light detection unit. A measurement unit is configured to include the terahertz wave generation unit and the terahertz wave detection unit. The main body unit and the measurement unit are optically connected to each other by a polarization maintaining fiber.

10 Claims, 7 Drawing Sheets

(56) References Cited

U.S. PATENT DOCUMENTS

| | | | |
|---|---|---|---|
| 2005/0100866 A1 | 5/2005 | Arnone et al. | |
| 2009/0283680 A1* | 11/2009 | Logan, Jr. | G01J 3/42 |
| | | | 250/339.07 |
| 2012/0326039 A1* | 12/2012 | Demers | G01N 21/3581 |
| | | | 250/338.4 |
| 2018/0306644 A1 | 10/2018 | Peng et al. | |

FOREIGN PATENT DOCUMENTS

| | | | | |
|---|---|---|---|---|
| JP | 2008-224452 A | 9/2008 | | |
| JP | 2011-203718 A | 10/2011 | | |
| JP | 2015-117964 A | 6/2015 | | |
| JP | 2019-020293 A | 2/2019 | | |
| JP | 2020-020641 A | 2/2020 | | |
| WO | WO 2016/070273 A1 | 5/2016 | | |
| WO | WO-2016196309 A2 * | 12/2016 | ......... | A61B 1/00188 |
| WO | WO-2018195429 A1 * | 10/2018 | ......... | G01N 21/3586 |

* cited by examiner

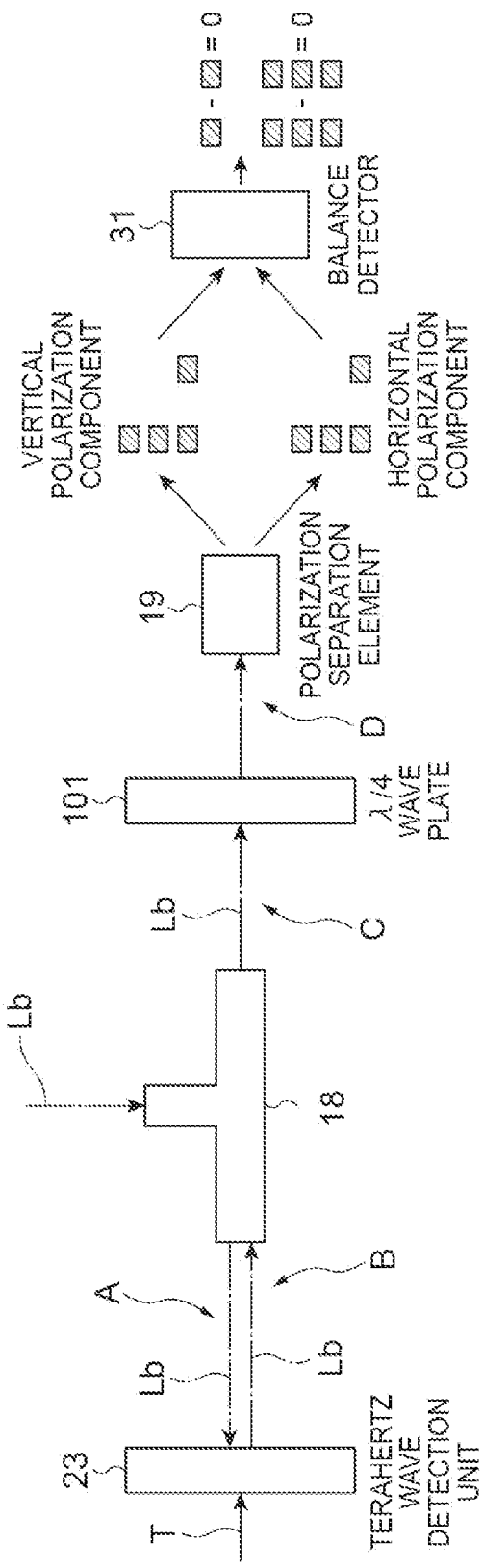
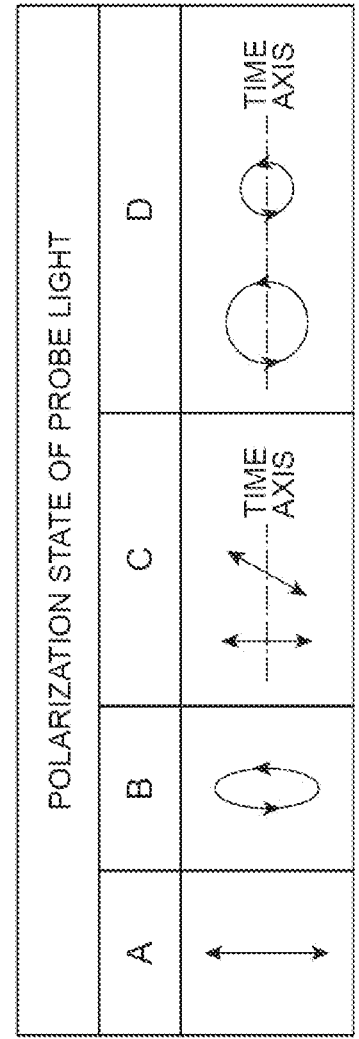
Fig.5A
Fig.5B

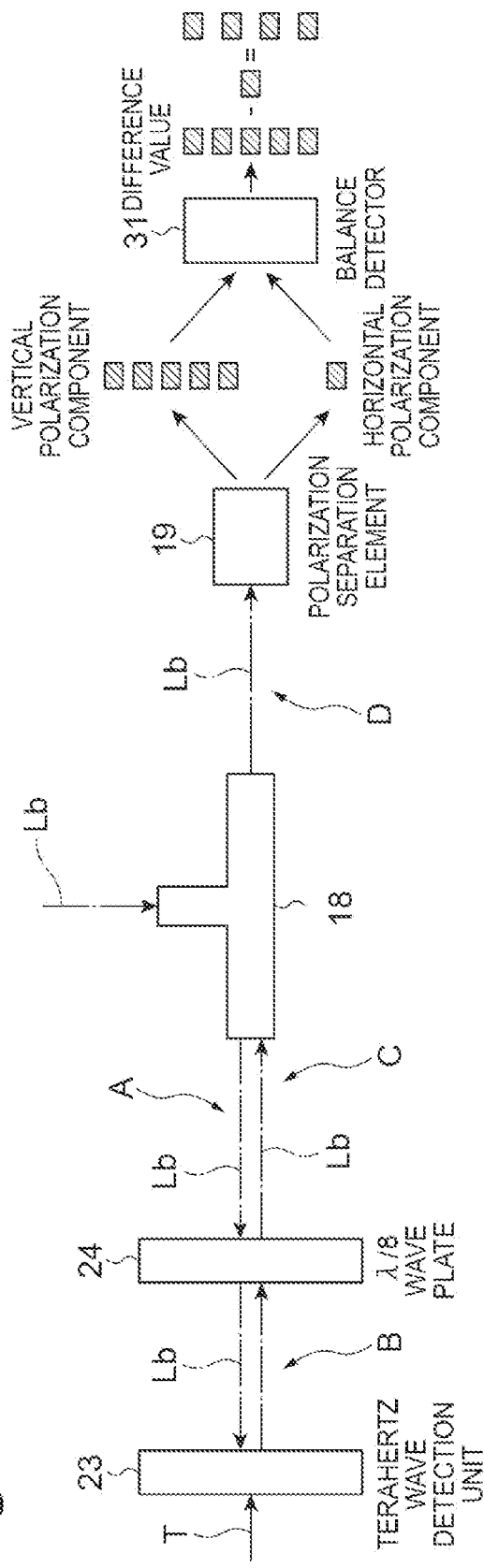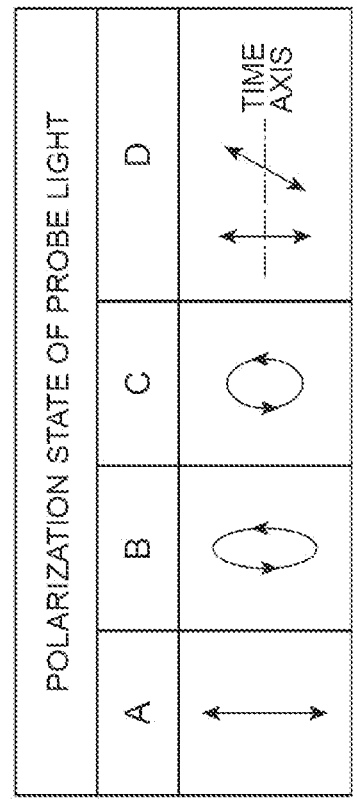
Fig.6A
Fig.6B

SPECTROSCOPIC MEASUREMENT DEVICE

TECHNICAL FIELD

The present disclosure relates to a spectroscopic measurement device.

BACKGROUND

The terahertz wave is an electromagnetic wave having a frequency of about 0.01 THz to 100 THz, which corresponds to an intermediate region between a light wave and a radio wave. The terahertz wave has an intermediate property between the light wave and the radio wave. As an application of the terahertz wave, a technique for acquiring information regarding a measurement target by measuring the time waveform of the electric field amplitude of the terahertz wave transmitted or reflected by the measurement target has been studied.

Examples of the spectroscopic measurement device using the terahertz wave include the devices described in Japanese Unexamined Patent Publication No. 2019-20293 and Japanese Unexamined Patent Publication No. 2020-20641. The spectroscopic measurement device is configured to include a light source unit that outputs pump light and probe light, a terahertz wave generation unit that generates a terahertz wave by the input of the pump light, a terahertz wave detection unit to which the terahertz wave acting on a measurement target and the probe light are input and which modulates the probe light with the terahertz wave, and a light detection unit that detects the probe light modulated by the terahertz wave detection unit.

In the field of time domain spectroscopy including spectroscopic measurement using terahertz waves, it is very important to secure the optical path length in the measurement optical system. It is not easy to change the layout of the optical system once determined. For example, in the spectroscopic measurement device described in Japanese Unexamined Patent Publication No. 2019-20293, it is particularly important to secure the optical path length of each of an optical system for inputting the pump light to the terahertz wave generation unit, an optical system for inputting the probe light to the terahertz wave detection unit, and an optical system for causing the terahertz wave generated by the terahertz wave generation unit to act on the measurement target and be input to the terahertz wave detection unit. After determining the positions of a mirror and the like forming these optical systems, the positions of measurement units such as a measurement prism are basically unchanged.

If the positions of measurement units are unchanged, it is conceivable that the shape, posture, and the like of a measurement target that can access the measurement unit (for example, come into contact with the measurement surface) are limited. In addition, it is conceivable that devices, production lines, and the like where the spectroscopic measurement device can be housed are limited. Therefore, in order to expand the use of the spectroscopic measurement device in the industrial field, it is necessary to improve the accessibility of the measurement unit to the measurement target.

SUMMARY

The disclosure has been made to solve the aforementioned problems, and it is an object of the disclosure to provide a spectroscopic measurement device capable of improving the accessibility of a measurement unit to a measurement target.

A spectroscopic measurement device according to an aspect of the disclosure includes: a light source unit configured to output pump light and probe light; a terahertz wave generation unit configured to generate a terahertz wave by input of the pump light; a terahertz wave detection unit to which the terahertz wave and the probe light are input and configured to modulate the probe light based on a refractive index that changes due to an electro-optical effect according to input of the terahertz wave; and a light detection unit configured to detect the probe light modulated by the terahertz wave detection unit. A main body unit is configured to include the light source unit and the light detection unit. A measurement unit is configured to include the terahertz wave generation unit and the terahertz wave detection unit. The main body unit and the measurement unit are optically connected to each other by a polarization maintaining fiber.

In the spectroscopic measurement device, the change in the refractive index of the terahertz wave detection unit is sampled with the probe light by the electro-optical effect according to the input of the terahertz wave. Therefore, the electric field waveform of the terahertz wave acting on the measurement target can be acquired, and the information of the measurement target can be acquired based on the electric field waveform. In addition, in the spectroscopic measurement device, the measurement unit is optically connected to the main body unit by the polarization maintaining fiber. Therefore, since the measurement unit can be freely arranged with respect to the main body unit, it is possible to improve the accessibility of the measurement unit to the measurement target. Restrictions on the shape or posture of the measurement target that can access the measurement unit can be eliminated, and the number of devices, production lines, and the like where the spectroscopic measurement device can be housed increases. Therefore, the applications of the spectroscopic measurement device in the industrial field will be expanded. The polarization state of the probe light input to the terahertz wave detection unit is maintained by using the polarization maintaining fiber, so that the detection efficiency of the probe light in the light detection unit can also be maintained.

The measurement unit may have a measurement surface on an optical path of the terahertz wave between the terahertz wave generation unit and the terahertz wave detection unit. By providing the measurement surface on the measurement unit that can be freely arranged with respect to the main body unit, it is possible to further improve the accessibility of the measurement unit to the measurement target.

The measurement unit may be configured to further include a wave plate arranged on an optical path where the probe light modulated by the terahertz wave detection unit is directed to the light detection unit. In the polarization maintaining fiber, since the refractive index differs between the first polarization component and the second polarization component perpendicular to the first polarization component, it is conceivable that the first polarization component and the second polarization component of the propagated light are time-shifted. Therefore, by arranging the wave plate at an appropriate position in the measurement unit, the detection efficiency of the probe light in the light detection unit can be guaranteed.

The wave plate may be a $\lambda/8$ wave plate, and in the measurement unit, the terahertz wave may be incident from one side of the terahertz wave detection unit, and the probe light may be incident from the other side of the terahertz wave detection unit and reflected toward the light detection unit. According to this configuration, for example, assuming that the initial polarization state of the probe light is linear polarization, the polarization components of the probe light can be appropriately separated into the first polarization component and the second polarization component by making the probe light incident on the λ/8 wave plate twice before and after the input to the terahertz wave detection unit. Therefore, the detection efficiency of the probe light in the light detection unit can be appropriately guaranteed.

The wave plate may be a λ/4 wave plate, and in the measurement unit, the terahertz wave and the probe light may be incident from one side of the terahertz wave detection unit, and the probe light may be transmitted to the other side of the terahertz wave detection unit and directed toward the light detection unit. According to this configuration, for example, assuming that the initial polarization state of the probe light is linear polarization, the polarization components of the probe light can be appropriately separated into the first polarization component and the second polarization component by making the probe light after the terahertz wave detection unit incident on the λ/4 wave plate once. Therefore, the detection efficiency of the probe light in the light detection unit can be appropriately guaranteed.

At least some of optical components forming the main body unit may be optically connected to each other by a polarization maintaining fiber. Therefore, it is possible to increase the degree of freedom in arranging the optical components in the main body unit. This also contributes to the miniaturization of the main body unit.

The main body unit may be configured to include an adjustment unit for adjusting an optical path length difference between the pump light and the probe light. Therefore, the input timings of the terahertz wave and the probe light to the terahertz wave detection unit can be freely adjusted. By sweeping the input timing of the probe light to the terahertz wave detection unit with the adjusting unit, the electric field waveform of the terahertz wave acting on the measurement target can be appropriately acquired.

The adjustment unit may be configured to include a plurality of mirrors and a stage for moving positions of the mirrors, and the pump light or the probe light may propagate in free space without depending on an optical fiber. In this case, the adjustment unit can be constructed with a simple configuration.

The adjustment unit may be a polarization maintaining fiber. In this case, the degree of freedom in arranging the optical components in the main body unit can be further increased. In addition, the size of the main body unit can be further reduced.

The light source unit may be a fiber laser. In this case, since the size of the light source unit can be reduced, the size of the main body unit can be further reduced.

Laser light output from the light source unit may be femtosecond-order ultrashort pulse light. By using the ultrashort pulse light, the bandwidth of the terahertz wave generated by the terahertz wave generation unit is expanded, so that the measurement bandwidth of the spectroscopic measurement device can be expanded.

BRIEF DESCRIPTION OF THE DRAWINGS

FIG. 5A is a schematic diagram showing a polarization state of probe light according to a comparative example.

FIG. 5B is a schematic diagram showing a polarization state of probe light according to the comparative example.

FIG. 6A is a schematic diagram showing a polarization state of probe light according to an embodiment.

FIG. 6B is a schematic diagram showing a polarization state of probe light according to the embodiment.

DETAILED DESCRIPTION

Hereinafter, preferred embodiments of a spectroscopic measurement device according to an aspect of the disclosure will be described in detail with reference to the diagrams.

Figure 1:
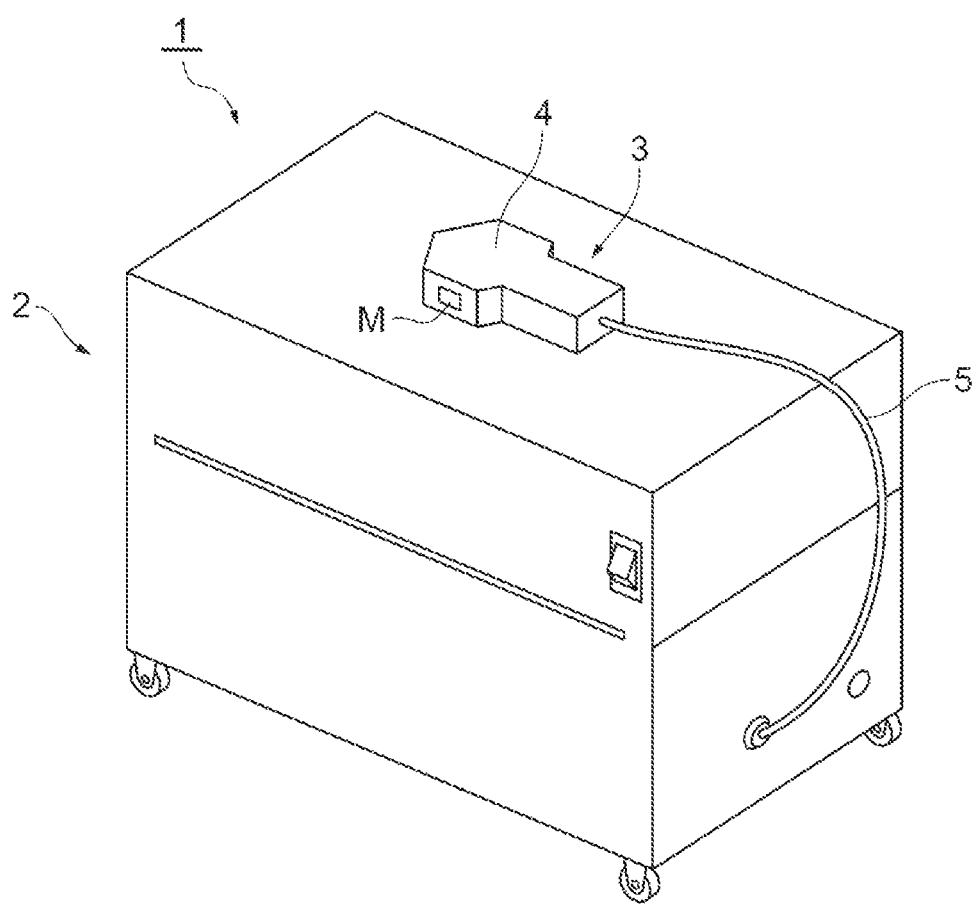
FIG. 1 is a perspective view showing an embodiment of a spectroscopic measurement device according to an aspect of the disclosure.

FIG. 1 is a perspective view showing an embodiment of a spectroscopic measurement device according to one aspect of the disclosure. A spectroscopic measurement device 1 shown in FIG. 1 is configured as a device for measuring optical parameters of a measurement target (not shown) by electro-optical sampling. The measurement target is a substance such as a liquid, a powder, or a solid. Examples of the optical parameters to be measured include a refractive index, an absorption coefficient, and a complex permittivity.

As shown in FIG. 1, the spectroscopic measurement device 1 includes, for example, a box-shaped main body unit 2 having a rectangular parallelepiped shape and a measurement unit 3 including a handy type housing 4 having a measurement surface M. The main body unit 2 and the measurement unit 3 are physically connected to each other by a flexible cable 5 in which a polarization maintaining fiber F described later is housed. Therefore, in the spectroscopic measurement device 1, the measurement unit 3 can be freely moved with respect to the main body unit 2, so that the measurement surface M can be arranged at an arbitrary position within the range of the length of the cable 5. In FIG. 1, the measurement surface M is provided on the side surface of the housing 4 of the measurement unit 3, but the position of the measurement surface M in the housing 4 is arbitrary.

Figure 2:
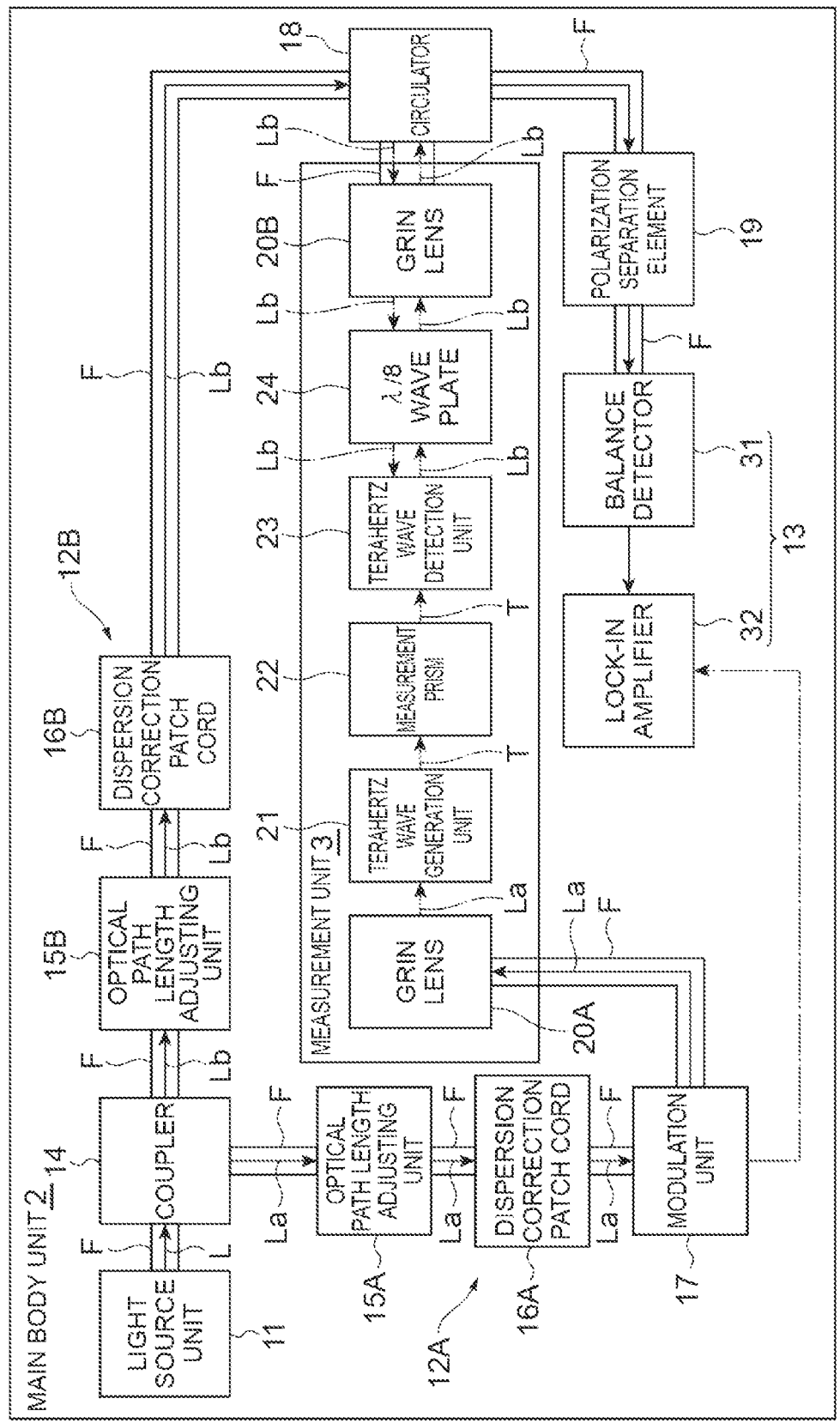
FIG. 2 is a block diagram showing components of the spectroscopic measurement device shown in FIG. 1.

FIG. 2 is a block diagram showing components of the spectroscopic measurement device shown in FIG. 1. As shown in FIG. 2, the main body unit 2 of the spectroscopic measurement device 1 is configured to include a light source unit 11 that outputs laser light L that becomes pump light La and probe light Lb, a light guide optical system 12A that guides the pump light La, a light guide optical system 12B that guides the probe light Lb, and a light detection unit 13 that detects the probe light Lb.

In the present embodiment, each component of the main body unit 2 is a fiber-based optical component. All of the components are optically connected to each other by the polarization maintaining fiber F. The fiber-based optical components are components that can be optically connected to each other by a fiber. Examples of the fiber-based optical component may include a component in which at least one of the light input end and the light output end is an optical fiber. The polarization maintaining fiber F has, for example, a structure in which a circular stress applying portion is arranged on both sides of the core. In the polarization maintaining fiber F, by applying a non-axisymmetric stress to the core to induce a large birefringence, a function of suppressing fluctuations in polarization due to fluctuations in birefringence is obtained.

The measurement unit 3 of the spectroscopic measurement device 1 is configured to include a terahertz wave generation unit 21 that generates a terahertz wave T in response to the input of the pump light La, a measurement prism 22 that forms the above-described measurement surface M (see FIG. 1), a terahertz wave detection unit 23 to which the terahertz wave T and the probe light Lb are input, and a λ/8 wave plate 24.

The light source unit 11 is a unit that outputs the laser light L that becomes the pump light La and the probe light Lb. In the present embodiment, the light source unit 11 is an ultrashort pulse fiber laser. The laser light L output from the light source unit 11 is femtosecond-order ultrashort pulse light. The pulse width of the laser light L is, for example, 200 fs or less. In the present embodiment, the laser light L has, for example, a pulse width of 60 fs, a repetition frequency of 100 MHz, and an average output of 50 mW. The wavelength of the laser light L is, for example, 1560 nm, which is the eye-safe band. The laser light L output from the light source unit 11 is branched into the pump light La and the probe light Lb by a coupler 14.

An optical path length adjusting unit (adjustment unit) 15A, a dispersion correction patch cord 16A, and a modulation unit 17 are arranged in the light guide optical system 12A for the pump light La branched by the coupler 14. The optical path length adjusting unit 15A is a unit that sweeps the timing of incidence of the terahertz wave T on the terahertz wave detection unit 23 with respect to the probe light Lb. In the present embodiment, the optical path length adjusting unit 15A is formed by a plurality of mirrors and a delay stage including a stage for moving the positions of the mirrors. In the optical path length adjusting unit 15A, the pump light La propagates in free space regardless of the optical fiber (polarization maintaining fiber F). The pump light La is input to the dispersion correction patch cord 16A in a state in which a predetermined delay is given to the probe light Lb by the delay stage.

The dispersion correction patch cord 16A is a unit that corrects the wavelength dispersion of light (here, the pump light La) passing through the polarization maintaining fiber F. The dispersion correction patch cord 16A is, for example, a dispersion compensation fiber having a length to cancel (apply reverse dispersion) the wavelength dispersion occurring according to the length of the polarization maintaining fiber F forming the light guide optical system 12A. Therefore, the pump light La is input to the modulation unit 17 in a state in which the pump light La is adjusted so that the pulse width when incident on the terahertz wave generation unit 21 is minimized.

The modulation unit 17 is a unit that periodically switches ON/OFF of the pump light La directed to the terahertz wave generation unit 21. The modulation unit 17 is, for example, an optical chopper. The optical chopper is a disk-shaped member in which ribs for shielding light are provided radially from the center with a predetermined phase angle. By periodically switching ON/OFF of the pump light La by the rotation of the optical chopper, the timing of generation of the terahertz wave T in the terahertz wave generation unit 21 is controlled. A signal indicating the repetition frequency of ON/OFF of the pump light La by the optical chopper is output to a lock-in amplifier 32 described later that forms the light detection unit 13. The modulation unit 17 is not limited to the modulation by the optical chopper, and may perform other modulations using an acoustic optical element, an electro-optical element, and the like.

An optical path length adjusting unit (adjustment unit) 15B, a dispersion correction patch cord 16B, and a circulator 18 are arranged in the light guide optical system 12B for the probe light Lb branched by the coupler 14. The optical path length adjusting unit 15B is a unit that adjusts the time difference between the inputs of the terahertz wave T and the probe light Lb to the terahertz wave detection unit 23. In the present embodiment, the optical path length adjusting unit 15B is formed by the same delay stage as the optical path length adjusting unit 15A arranged in the light guide optical system 12A. In the optical path length adjusting unit 15B, the probe light Lb propagates in free space regardless of the optical fiber (polarization maintaining fiber F). The probe light Lb is input to the dispersion correction patch cord 16B in a state in which a predetermined delay is given to the pump light La by the delay stage.

In the present embodiment, the dispersion correction patch cord 16B is the same dispersion compensation fiber as the dispersion correction patch cord 16A arranged in the light guide optical system 12A. Therefore, the probe light Lb is input to the circulator 18 in a state in which the probe light Lb is adjusted so that the pulse width when incident on the terahertz wave detection unit 23 is minimized. The circulator 18 is an optical component that has three ports for light and separates two light components traveling in opposite directions from each other. The probe light Lb input to the port 1 of the circulator 18 is output from the port 2 toward the measurement unit 3. The probe light Lb returned from the measurement unit 3 to the port 2 is output from the port 3 and input to the light detection unit 13 through a polarization separation element 19.

The pump light La transmitted through the modulation unit 17 and the probe light Lb output from the port 2 of the circulator 18 reach the measurement unit 3 through the polarization maintaining fiber F housed in the cable 5 (see FIG. 1), and are emitted from GRIN lenses 20A and 20B to the outside of the fiber. That is, the optical connection between the pump light La and the probe light Lb between the main body unit 2 and the measurement unit 3 is realized by two refractive index distribution type lenses (GRIN lenses) 20A and 20B arranged in the measurement unit 3. The pump light La input from the modulation unit 17 to the measurement unit 3 through one GRIN lens 20A is input to the terahertz wave generation unit 21.

The terahertz wave generation unit 21 is a unit that generates the terahertz wave T by the incidence of the pump light La. The terahertz wave generation unit 21 may be formed of an organic nonlinear optical crystal, such as DAST (4-dimethylamino-N-methyl-4-stilbazolium tosylate), when the wavelength of the laser light L used as the pump light La is 1560 nm, for example. The pulse width of the terahertz wave T generated from the crystal is generally about several picoseconds, and includes frequency components in the band of about 0.1 THz to 5 THz. The terahertz wave T generated by the terahertz wave generation unit 21 is input to the measurement prism 22.

The method of the present embodiment is a method called total reflection attenuation spectroscopy (ATR), and measurement is performed in a state in which a measurement target is in contact with the measurement surface M. The measurement prism 22 has, for example, an input surface, an output surface, and a total reflection surface. The total reflection surface of the measurement prism 22 is a surface corresponding to the measurement surface M described above. The measurement surface M is located on the optical path of the terahertz wave T between the terahertz wave generation unit 21 and the terahertz wave detection unit 23. The terahertz wave T is incident on the measurement prism 22 from the input surface, is totally reflected by the measurement surface M, and then is emitted from the output surface to the outside of the measurement prism 22. The terahertz wave T emitted outside the measurement prism 22 is input to the terahertz wave detection unit 23. The evanescent component generated during the total reflection of the terahertz wave T on the measurement surface M acts on the measurement target arranged on the measurement surface M. As a result, the information of the measurement target is acquired by the terahertz wave T.

The terahertz wave detection unit 23 is a unit that detects the terahertz wave T acting on the measurement target. The terahertz wave detection unit 23 is formed of, for example, an electro-optical crystal obtained by cutting out the (111) plane of GaAs. In the present embodiment, the terahertz wave T is incident from one side of the terahertz wave detection unit 23, and the probe light Lb is incident from the other side of the terahertz wave detection unit 23. In the terahertz wave detection unit 23, the refractive index changes due to the electro-optical effect according to the input of the terahertz wave T, and the probe light Lb is modulated based on the refractive index.

The probe light Lb is input to the measurement unit 3 through the other GRIN lens 20B arranged in the measurement unit 3. The probe light Lb input to the measurement unit 3 passes through the λ/8 wave plate 24 and is incident on the other side of the terahertz wave detection unit 23. The probe light Lb modulated by the terahertz wave detection unit 23 is reflected by the terahertz wave detection unit 23 and moves toward the light detection unit 13. The probe light Lb passes through the λ/8 wave plate 24 again, and then returns to the main body unit 2 through the GRIN lens 20B. The probe light Lb returned to the main body unit 2 passes through the circulator 18, and input to the light detection unit 13 through the polarization separation element 19.

The light detection unit 13 is a unit that detects the probe light Lb modulated by the terahertz wave detection unit 23. In the present embodiment, the light detection unit 13 is formed by a balance detector 31 and the lock-in amplifier 32. The polarization separation element 19 is arranged in front of the light detection unit 13. The polarization separation element 19 is, for example, an optical fiber fusion-type polarization beam splitter. The optical fiber fusion-type polarization beam splitter is an optical element that separates a first polarization component and a second polarization component of light from each other by making the light pass through an optical fiber. The first polarization component is, for example, a component in the same direction as the polarization of the laser light L output from the light source unit 11. The second polarization component is a component in a direction perpendicular to the first polarization component. Hereinafter, for convenience of explanation, the first polarization component will be referred to as a vertical polarization component, and the second polarization component will be referred to as a horizontal polarization component.

The balance detector 31 detects a difference between the vertical polarization component and the horizontal polarization component of the probe light Lb separated by the polarization separation element 19. The balance detector 31 outputs a difference signal based on the difference between the vertical polarization component and the horizontal polarization component to the lock-in amplifier 32. By performing the difference detection, the intensity fluctuation component of the probe light Lb is removed. In performing the difference detection, it is preferable to adjust the sensitivity so that the strength of the difference signal from the balance detector 31 is zero in a state in which the terahertz wave T is not incident on the terahertz wave detection unit 23. An optical attenuator may be arranged between the polarization separation element 19 and the balance detector 31. By arranging the optical attenuator, the intensity of the vertical polarization component and the intensity of the horizontal polarization component input to the balance detector 31 can be easily adjusted.

The lock-in amplifier 32 synchronously detects the difference signal output from the balance detector 31 based on the repetition frequency of ON/OFF of the pump light La by the optical chopper. The detection signal output from the lock-in amplifier 32 has a value depending on the electric field strength of the terahertz wave T input to the terahertz wave detection unit 23.

Generally, the pulse width of the terahertz wave T is about picoseconds. On the other hand, the pulse width of the probe light Lb is about femtoseconds. The pulse width of the probe light Lb is several orders of magnitude smaller than that of the terahertz wave T. Therefore, since the timing of incidence of the terahertz wave T on the terahertz wave detection unit 23 is swept by the optical path length adjusting unit 15A, the electric field waveform (time waveform of the electric field amplitude) of the terahertz wave T can be obtained. Based on the electric field waveform of the terahertz wave T, the optical parameters of the measurement target can be obtained.

Figure 3:
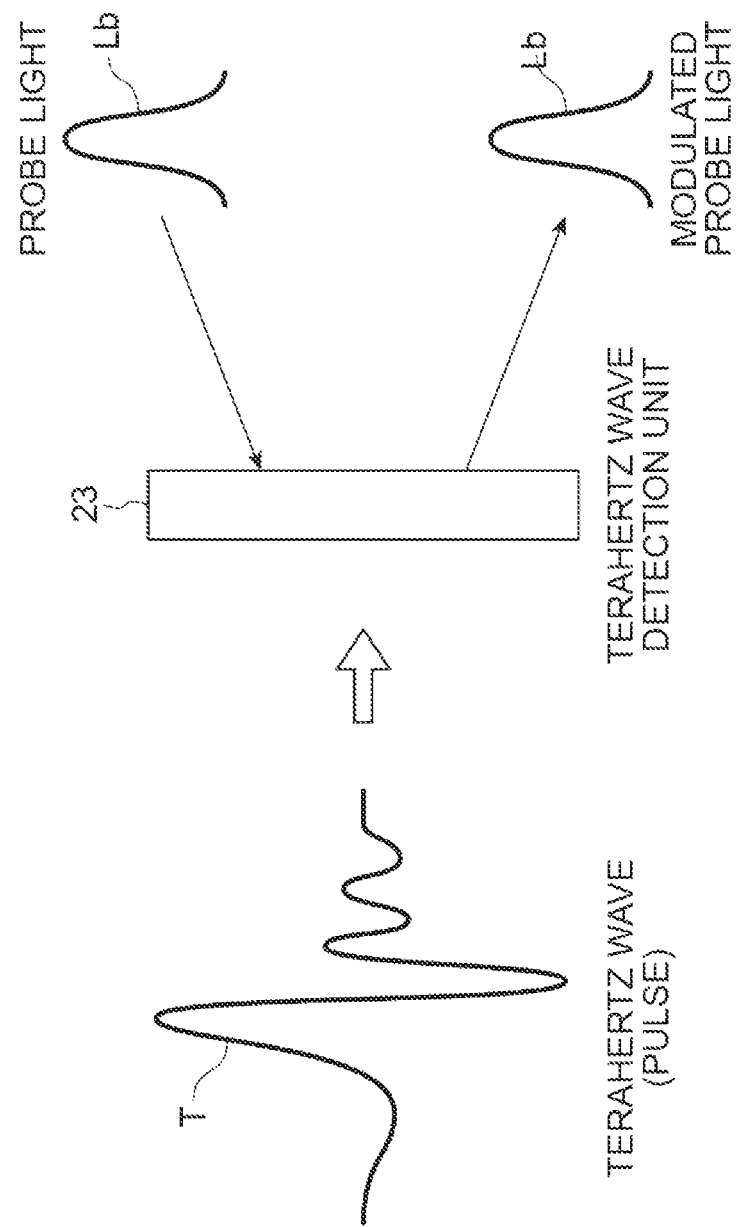
FIG. 3 is a schematic diagram showing the principle of electro-optical sampling by the spectroscopic measurement device shown in FIG. 1.

FIG. 3 is a schematic diagram showing the principle of electro-optical sampling by the spectroscopic measurement device shown in FIG. 1. As shown in FIG. 3, in the electro-optical sampling of the spectroscopic measurement device 1, a pulsed terahertz wave T is used. With the input of the terahertz wave T, the refractive index changes due to the electro-optical effect in the terahertz wave detection unit 23. The electro-optical effect is a phenomenon in which the optical characteristics of a medium change depending on the electric field incident on the medium. The probe light Lb modulated by the terahertz wave detection unit 23 based on the refractive index changed by the electro-optical effect becomes the probe light Lb having the electric field waveform information of the terahertz wave T. By sampling the refractive index change in the terahertz wave detection unit 23 with the probe light Lb, the electric field waveform of the terahertz wave T acting on the measurement target can be acquired.

Figures 4A, 4B:
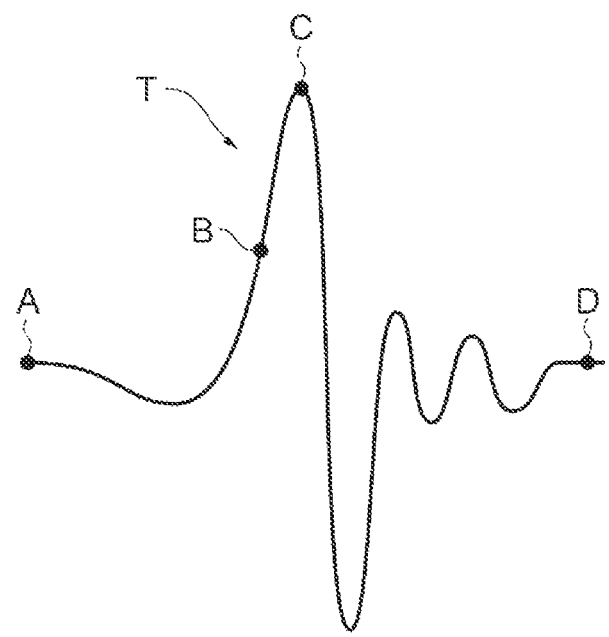
FIG. 4A is a schematic diagram showing the relationship between the electric field waveform of a terahertz wave acting on a measurement target and the polarization state of modulated probe light.
FIG. 4B is a schematic diagram showing the relationship between the electric field waveform of a terahertz wave acting on a measurement target and the polarization state of modulated probe light.

FIGS. 4A and 4B are schematic views showing the relationship between the electric field waveform of a terahertz wave acting on a measurement target and the polarization state of modulated probe light. As shown in FIGS. 4A and 4B, the refractive index change in the terahertz wave detection unit 23 can be read as a change in the polarization state of the probe light Lb after the terahertz wave detection unit 23. For example, it is preferable that the initial polarization state of the probe light Lb directed to the terahertz wave detection unit 23 is linear polarization and the polarization state of the probe light Lb input to the polarization separation element 19 when the electric field strength of the terahertz wave T is zero (in the case of A and D in FIG. 4A) is circular polarization.

For example, when the electric field strength of the terahertz wave T is zero (in the case of A and D in FIG. 4A), the refractive index change in the terahertz wave detection unit 23 does not occur. In this case, the polarization state of the probe light Lb after the terahertz wave detection unit 23 is maintained in the initial polarization state. At this time, if the polarization state of the probe light Lb input to the polarization separation element 19 is circular polarization, the output from the balance detector 31 is zero. On the other hand, when the electric field strength of the terahertz wave T is larger than zero (in the case of B and C in FIG. 4A), the refractive index change in the terahertz wave detection unit 23 occurs according to the electric field strength of the terahertz wave T. At this time, if the polarization state of the probe light Lb after the terahertz wave detection unit 23 changes to elliptical polarization having a phase corresponding to the refractive index change, the output from the balance detector 31 is a value (non-zero value) corresponding to the electric field strength of the terahertz wave T.

Next, a method for restoring the electric field waveform of the terahertz wave based on the polarization state of the probe light will be described. As described above, in the spectroscopic measurement device 1, the main body unit 2 and the measurement unit 3 are optically connected to each other by the polarization maintaining fiber F. In addition, the optical components forming the main body unit 2 are also optically connected to each other by the polarization maintaining fiber F. In the polarization maintaining fiber F, a non-axisymmetric stress is applied to the core, so that the refractive index for the vertical polarization component of the propagating light and the refractive index for the horizontal polarization component of the propagating light are different from each other. Therefore, in the light propagating through the polarization maintaining fiber F, there may be a difference in output timing between the vertical polarization component and the horizontal polarization component.

As a comparative example, as shown in FIG. 5A, in a mode in which the terahertz wave T is incident from one side of the terahertz wave detection unit 23 and the probe light Lb is incident from the other side of the terahertz wave detection unit 23, for example, a case where a $\lambda/4$ wave plate 101 is arranged between the circulator 18 and the polarization separation element 19 is assumed. In this case, as shown in FIG. 5B, assuming that the probe light Lb (A in FIG. 5A) directed to the terahertz wave detection unit 23 is linearly polarized light and the probe light Lb modulated by the terahertz wave detection unit 23 (B in FIG. 5A) is elliptically polarized light, the probe light Lb (C in FIG. 5A) directed from the circulator 18 to the polarization separation element 19 becomes two linearly polarized light components with different timings.

When the probe light Lb passes through the $\lambda/4$ wave plate 101 immediately before being input to the polarization separation element 19, the probe light Lb (D in FIG. 5A) transmitted through the $\lambda/4$ wave plate 101 becomes two circularly polarized light components with different timings. In this case, since the vertical polarization component and the horizontal polarization component of the probe light Lb separated by the polarization separation element 19 are equal, the difference value output from the balance detector 31 is zero. Therefore, it is assumed that, despite a change in the refractive index in the terahertz wave detection unit 23, the polarization state of the probe light Lb detected by the light detection unit 13 is the same as in the case of linear polarization and a detection result that the electric field strength of the terahertz wave T is zero is obtained.

On the other hand, in the spectroscopic measurement device 1, as shown in FIG. 6A, the $\lambda/8$ wave plate 24 is arranged on the optical path where the probe light Lb modulated by the terahertz wave detection unit 23 is directed to the light detection unit 13, more specifically, arranged between the terahertz wave detection unit 23 and the GRIN lens 20B (see FIG. 2) in the measurement unit 3. In this configuration, as shown in FIG. 6B, the probe light Lb (A in FIG. 6A) directed from the circulator 18 to the $\lambda/8$ wave plate 24 is linearly polarized light, and the probe light Lb (B in FIG. 6A) modulated by the terahertz wave detection unit 23 is elliptically polarized light having a phase corresponding to a change in the refractive index.

The probe light Lb (C in FIG. 6A) reflected by the terahertz wave detection unit 23 and transmitted through the $\lambda/8$ wave plate 24 again becomes elliptically polarized light having different ellipticity, and the probe light Lb (D in FIG. 6A) directed from the circulator 18 to the polarization separation element 19 becomes two linearly polarized light components with different timings. When a difference value between the vertical polarization component and the horizontal polarization component of the probe light Lb separated by the polarization separation element 19 is detected by the balance detector 31, the difference value is a non-zero value. Therefore, the electric field waveform of the terahertz wave T based on the polarization state of the probe light Lb can be easily restored.

The timing difference between the two linearly polarized light components in the probe light Lb is approximately on the order of picoseconds. In a balance detector below the MHz band that is usually used for this type of spectroscopic measurement, difference detection is performed on the assumption that two linearly polarized light components in the probe light Lb are simultaneously input to the balance detector without the timing difference therebetween. Therefore, for the probe light Lb after passing through the $\lambda/8$ wave plate 24, even if the linearly polarized light component is separated in time by the action of the polarization maintaining fiber F, there is no influence on the measurement of the terahertz wave T.

As described above, in the spectroscopic measurement device 1, the change in the refractive index of the terahertz wave detection unit 23 is sampled with the probe light Lb by the electro-optical effect according to the input of the terahertz wave T. Therefore, the electric field waveform of the terahertz wave T acting on the measurement target can be acquired, and the information of the measurement target can be acquired based on the electric field waveform. In addition, in the spectroscopic measurement device 1, the measurement unit 3 is optically connected to the main body unit 2 by the polarization maintaining fiber F. Therefore, since the measurement unit 3 (measurement surface M) can be freely arranged with respect to the main body unit 2, it is possible to improve the accessibility of the measurement unit 3 to the measurement target.

Restrictions on the shape or posture of the measurement target that can access the measurement unit 3 can be eliminated, and the number of devices, production lines, and the like where the spectroscopic measurement device 1 can be housed increases. Therefore, the applications of the spectroscopic measurement device 1 in the industrial field will be expanded. In the spectroscopic measurement device 1, the polarization state of the probe light Lb input to the terahertz wave detection unit 23 is maintained by using the polarization maintaining fiber F, so that the detection efficiency of the probe light Lb in the light detection unit 13 can also be maintained.

In the spectroscopic measurement device 1, since the terahertz wave detection unit 23 is formed of an electro-optical crystal, it is not necessary to take measures against electromagnetic compatibility (EMC). For example, when the terahertz wave detection unit 23 is a photoconductive antenna, an electric signal is used in the terahertz wave detection unit 23. Therefore, in the measurement unit 3, it is necessary to design the housing 4 including an electromagnetic shield in addition to noise countermeasures. On the other hand, in electro-optical sampling in which the terahertz wave detection unit 23 is formed of an electro-optical crystal, no electric signal is used in the terahertz wave detection unit 23. Therefore, the housing 4 of the measurement unit 3 can be formed of plastic or the like without an electromagnetic shield.

The spectroscopic measurement device 1 is configured to include a wave plate arranged on the optical path where the probe light Lb modulated by the terahertz wave detection unit 23 is directed to the light detection unit 13. In the present embodiment, the wave plate is the λ/8 wave plate 24, and in the measurement unit 3, the terahertz wave T is incident from one side of the terahertz wave detection unit 23, and the probe light Lb is incident from the other side of the terahertz wave detection unit 23 and reflected toward the light detection unit 13. According to this configuration, for example, assuming that the initial polarization state of the probe light Lb is linear polarization, the polarization components of the probe light Lb can be appropriately separated into a vertical polarization component and a horizontal polarization component by making the probe light Lb incident on the λ/8 wave plate 24 twice before and after the input to the terahertz wave detection unit 23. Therefore, the detection efficiency of the probe light Lb in the light detection unit 13 can be appropriately guaranteed.

In the spectroscopic measurement device 1, at least some of the optical components forming the main body unit 2 are optically connected by the polarization maintaining fiber F. In the present embodiment, the optical components forming the main body unit 2 are all fiber-based optical components except for the optical path length adjusting units 15A and 15B, and all of these components are optically connected to each other by the polarization maintaining fiber F. Therefore, it is possible to increase the degree of freedom in arranging the optical components in the main body unit 2. This also contributes to the miniaturization of the main body unit 2.

In the spectroscopic measurement device 1, the main body unit 2 is configured to include the optical path length adjusting units 15A and 15B for adjusting the optical path length difference between the pump light La and the probe light Lb. Therefore, the input timings of the terahertz wave T and the probe light Lb to the terahertz wave detection unit 23 can be freely adjusted. For example, by sweeping the input timing of the terahertz wave T to the terahertz wave detection unit 23 with the optical path length adjusting unit 15A, the electric field waveform of the terahertz wave T acting on the measurement target can be appropriately acquired.

In the spectroscopic measurement device 1, each of the optical path length adjusting units 15A and 15B is configured to include a plurality of mirrors and a stage for moving the positions of the mirrors, and the pump light La or the probe light Lb propagates in free space regardless of the optical fiber. Therefore, the optical path length adjusting units 15A and 15B can be constructed with a simple configuration. In addition, in the spectroscopic measurement device 1, the light source unit 11 is a fiber laser. Therefore, since the size of the light source unit 11 can be reduced, the size of the main body unit 2 can be further reduced.

The disclosure is not limited to the embodiment described above. For example, in the embodiment described above, the wave plate is the λ/8 wave plate 24, and in the measurement unit 3, the terahertz wave T is incident from one side of the terahertz wave detection unit 23, and the probe light Lb is incident from the other side of the terahertz wave detection unit 23 and reflected toward the light detection unit 13. However, the configuration of the measurement unit 3 may be differently set.

Figure 7:
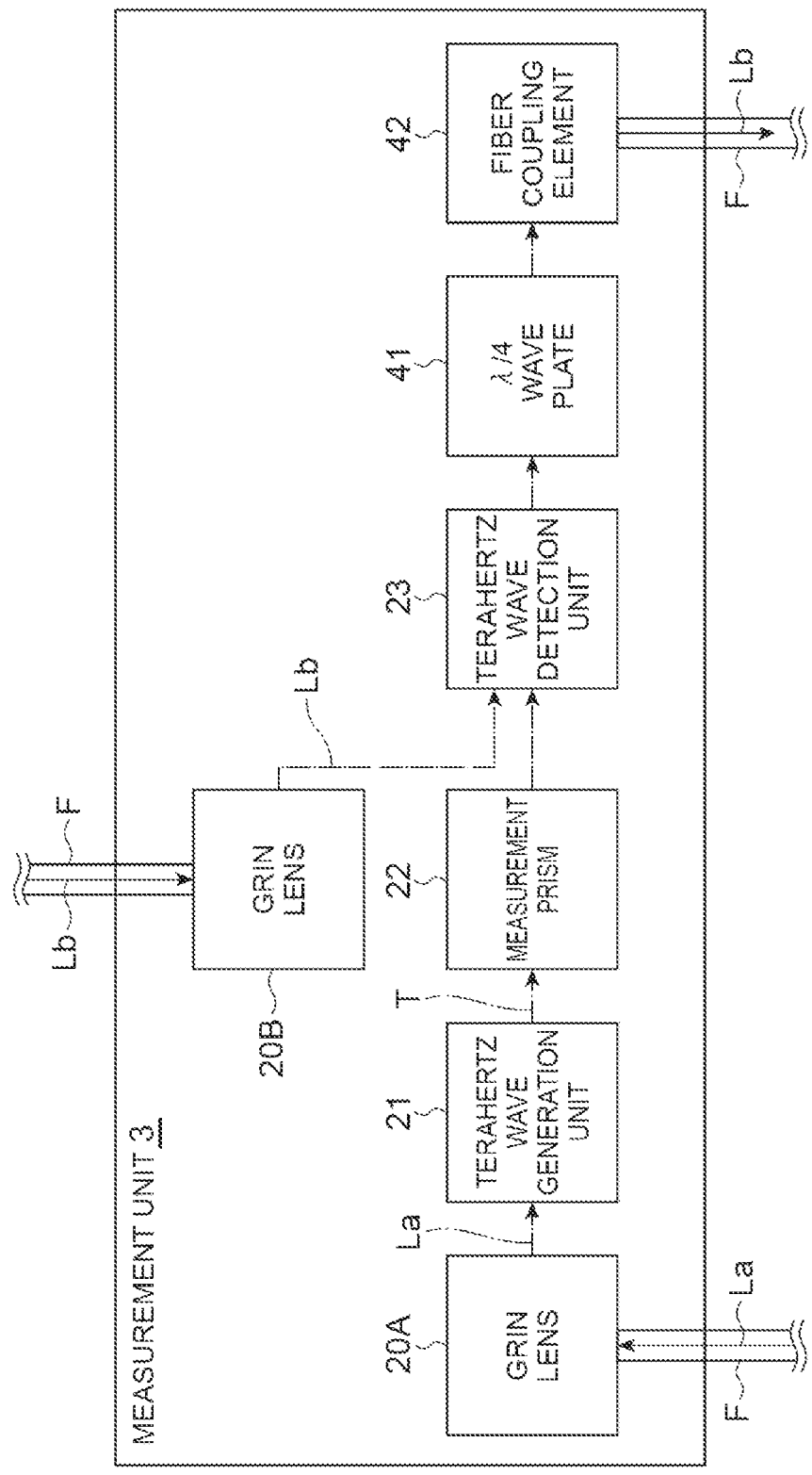
FIG. 7 is a block diagram showing main components of a spectroscopic measurement device according to a modification example.

For example, as shown in FIG. 7, the wave plate may be a λ/4 wave plate 41, and in the measurement unit 3, the terahertz wave T and the probe light Lb may be incident from one side of the terahertz wave detection unit 23, and the probe light Lb may be transmitted to the other side of the terahertz wave detection unit 23 and directed toward the light detection unit 13. According to this configuration, for example, assuming that the initial polarization state of the probe light Lb is linear polarization, the probe light Lb directed to the polarization separation element 19 can be made to be two linearly polarized light components with different timings by making the probe light Lb after the terahertz wave detection unit 23 incident on the λ/4 wave plate 41 once. Therefore, since the polarization components of the probe light Lb can be appropriately separated into the vertical polarization component and the horizontal polarization component, the detection efficiency of the probe light Lb in the light detection unit 13 can be appropriately guaranteed.

In the example of FIG. 7, a fiber coupling element 42 is arranged on the rear side of the λ/4 wave plate 41 in order to guide the probe light Lb modulated by the terahertz wave detection unit 23 from the measurement unit 3 to the main body unit 2. The fiber coupling element 42 is, for example, a lens. The fiber coupling element 42 causes the probe light Lb transmitted through the λ/4 wave plate 41 to be incident on the polarization maintaining fiber F that optically connects the main body unit 2 and the measurement unit 3 to each other.

In the embodiment described above, each of the optical path length adjusting units 15A and 15B is configured to include a plurality of mirrors and a stage for moving the positions of the mirrors, and the pump light La or the probe light Lb propagates in free space regardless of the optical fiber. Instead of this, at least one of the optical path length adjusting units 15A and 15B may be the polarization maintaining fiber F. In this case, the degree of freedom in arranging the optical components in the main body unit 2 can be further increased. In addition, the size of the main body unit 2 can be further reduced.

As an example of the case where each of the optical path length adjusting units 15A and 15B is the polarization maintaining fiber F, a configuration can be considered in which the polarization maintaining fiber F having a predetermined length is wound around a piezoelectric element. According to this configuration, the fiber length of the polarization maintaining fiber F wound around the piezoelectric element can be adjusted by applying a voltage to the piezoelectric element to change the volume. Therefore, it is possible to accurately control the optical path length of the pump light La or the probe light Lb.

In the embodiment described above, the dispersion correction patch cord 16A is arranged in the light guide optical system 12A for the pump light La, and the dispersion correction patch cord 16B is arranged in the light guide optical system 12B for the probe light Lb. However, the dispersion correction patch cords 16A and 16B do not necessarily have to be used. In this case, the spectroscopic measurement device 1 may be configured by using a laser light source to which anomalous dispersion is given in advance so that the pulse widths of the pump light La and the probe light Lb, which have propagated by a predetermined distance, are the shortest when the pump light La and the probe light Lb are incident on the terahertz wave generation unit 21 and the terahertz wave detection unit 23. Instead of the dispersion correction patch cords 16A and 16B, a polarization holding patch cord may be used, or the polarization holding patch cord and the dispersion correction patch cord may be used in combination.

In the embodiment described above, in the measurement unit 3, a wave plate ($\lambda/8$ wave plate 24, $\lambda/4$ wave plate 41) is provided on the optical path where the probe light Lb modulated by the terahertz wave detection unit 23 is directed to the light detection unit 13. However, instead of the wave plate, other elements capable of adjusting the polarization state of the probe light Lb may be arranged. Examples of such an element include a Faraday rotator. As in the example shown in FIG. 7, when the probe light Lb does not reciprocate on the wave plate, a polarized rotator (for example, a quartz polarized rotator) and the like can be used.

In the embodiment described above, an example has been described in which the measurement is performed in a state in which the measurement target is in contact with the measurement surface M based on the total reflection attenuation spectroscopy (ATR) method. However, the measurement method in the spectroscopic measurement device 1 is not limited to this. For example, the terahertz wave T emitted from the measurement surface M into the free space may be applied to the measurement target, and the reflected light of the terahertz wave T may be incident on the measurement surface M again to be detected by the terahertz wave detection unit 23. In addition, for example, the terahertz wave T emitted from the measurement surface M into the free space may be applied to the measurement target, and the transmitted light of the terahertz wave T may be reflected by a mirror or the like and be incident on the measurement surface M again to be detected by the terahertz wave detection unit 23.

The measurement surface M may not be provided on the housing 4 of the measurement unit 3, and the measurement target may be arranged in the housing 4. In this case, for example, in the measurement unit 3, the arrangement of the measurement prism 22 may be omitted, and instead, the measurement target may be arranged between the terahertz wave generation unit 21 and the terahertz wave detection unit 23. Then, the terahertz wave T generated by the terahertz wave generation unit 21 may be applied to the measurement target, and the transmitted light of the terahertz wave T may be detected by the terahertz wave detection unit 23.

What is claimed is:

1. A spectroscopic measurement device, comprising:
   a light source unit configured to output pump light and probe light;
   a terahertz wave generation unit configured to generate a terahertz wave by input of the pump light;
   a terahertz wave detection unit to which the terahertz wave and the probe light are input and configured to modulate the probe light based on a refractive index that changes due to an electro-optical effect according to input of the terahertz wave;
   a light detection unit configured to detect the probe light modulated by the terahertz wave detection unit;
   a main body unit configured to include the light source unit and the light detection unit;
   a measurement unit configured to include the terahertz wave generation unit and the terahertz wave detection unit; and
   a polarization maintaining fiber,
   wherein the main body unit and the measurement unit are optically connected to each other by the polarization maintaining fiber,
   the probe light modulated by the terahertz wave detection unit is input to the light detection unit through the polarization maintaining fiber,
   the measurement unit is configured to further include a wave plate arranged on an optical path where the probe light modulated by the terahertz wave detection unit is directed to the light detection unit, and
   the probe light that has passed through the wave plate in the measurement unit is incident into the polarization maintaining fiber, the probe light has a first polarization component and a second polarization component, and a refractive index of the first polarization component and a refractive index of the second polarization component are different from each other in the polarization maintaining fiber.

2. The spectroscopic measurement device according to claim 1,
   wherein the measurement unit has a measurement surface on an optical path of the terahertz wave between the terahertz wave generation unit and the terahertz wave detection unit.

3. A spectroscopic measurement device, comprising:
   a light source unit configured to output pump light and probe light;
   a terahertz wave generation unit configured to generate a terahertz wave by input of the pump light;
   a terahertz wave detection unit to which the terahertz wave and the probe light are input and configured to modulate the probe light based on a refractive index that changes due to an electro-optical effect according to input of the terahertz wave;
   a light detection unit configured to detect the probe light modulated by the terahertz wave detection unit;
   a main body unit configured to include the light source unit and the light detection unit;
   a measurement unit configured to include the terahertz wave generation unit and the terahertz wave detection unit; and
   a polarization maintaining fiber,
   wherein the main body unit and the measurement unit are optically connected to each other by the polarization maintaining fiber,
   the probe light modulated by the terahertz wave detection unit is input to the light detection unit through the polarization maintaining fiber,
   the measurement unit is configured to further include a wave plate arranged on an optical path where the probe light modulated by the terahertz wave detection unit is directed to the light detection unit, and
   the probe light that has passed through the wave plate in the measurement unit is incident into the polarization maintaining fiber, the probe light has a first polarization component and a second polarization component, and a refractive index of the first polarization component and a refractive index of the second polarization component are different from each other in the polarization maintaining fiber,
   wherein the wave plate is a $\lambda/8$ wave plate, and
   in the measurement unit, the terahertz wave is incident from one side of the terahertz wave detection unit, and the probe light is incident from the other side of the terahertz wave detection unit and reflected toward the light detection unit.

4. A spectroscopic measurement device, comprising:
a light source unit configured to output pump light and probe light;
a terahertz wave generation unit configured to generate a terahertz wave by input of the pump light;
a terahertz wave detection unit to which the terahertz wave and the probe light are input and configured to modulate the probe light based on a refractive index that changes due to an electro-optical effect according to input of the terahertz wave;
a light detection unit configured to detect the probe light modulated by the terahertz wave detection unit;
a main body unit configured to include the light source unit and the light detection unit;
a measurement unit configured to include the terahertz wave generation unit and the terahertz wave detection unit; and
a polarization maintaining fiber,
wherein the main body unit and the measurement unit are optically connected to each other by the polarization maintaining fiber,
the probe light modulated by the terahertz wave detection unit is input to the light detection unit through the polarization maintaining fiber,
the measurement unit is configured to further include a wave plate arranged on an optical path where the probe light modulated by the terahertz wave detection unit is directed to the light detection unit, and
the probe light that has passed through the wave plate in the measurement unit is incident into the polarization maintaining fiber, the probe light has a first polarization component and a second polarization component, and a refractive index of the first polarization component and a refractive index of the second polarization component are different from each other in the polarization maintaining fiber,
wherein the wave plate is a λ/4 wave plate, and
in the measurement unit, the terahertz wave and the probe light are incident from one side of the terahertz wave detection unit, and the probe light is transmitted to the other side of the terahertz wave detection unit and directed toward the light detection unit.

5. The spectroscopic measurement device according to claim 1,
wherein at least some of optical components forming the main body unit are optically connected to each other by a polarization maintaining fiber.

6. The spectroscopic measurement device according to claim 1,
wherein the main body unit is configured to include an adjustment unit for adjusting an optical path length difference between the pump light and the probe light.

7. The spectroscopic measurement device according to claim 6,
wherein the adjustment unit is configured to include a plurality of mirrors and a stage for moving positions of the mirrors, and the pump light or the probe light propagates in free space without depending on an optical fiber.

8. The spectroscopic measurement device according to claim 6,
wherein the adjustment unit is a polarization maintaining fiber.

9. The spectroscopic measurement device according to claim 1,
wherein the light source unit is a fiber laser.

10. The spectroscopic measurement device according to claim 1,
wherein laser light output from the light source unit is femtosecond-order ultrashort pulse light.

* * * * *